(12) United States Patent
Uchida

(10) Patent No.: US 6,961,738 B1
(45) Date of Patent: Nov. 1, 2005

(54) INFORMATION PROCESSING DEVICE AND INFORMATION PROCESSING METHOD USING FINGERPRINT IDENTIFICATION

(75) Inventor: Kaoru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/396,423

(22) Filed: Sep. 15, 1999

(30) Foreign Application Priority Data

Sep. 16, 1998 (JP) .............................. 10-261502

(51) Int. Cl.[7] .......................................... G06F 17/30
(52) U.S. Cl. ...................... 707/202; 707/10; 713/323
(58) Field of Search ................... 707/1, 7, 10, 104.1, 707/202; 705/54, 51, 80, 57, 52; 713/187, 713/200, 201, 155, 186, 168, 189, 323, 202; 356/71; 382/124

(56) References Cited

U.S. PATENT DOCUMENTS

| | | | | |
|---|---|---|---|---|
| 5,377,269 | A | * | 12/1994 | Heptig et al. ................ 713/202 |
| 5,815,252 | A | * | 9/1998 | Price-Francis ................ 356/71 |
| 5,848,231 | A | * | 12/1998 | Teitelbaum et al. ......... 713/200 |
| 5,978,924 | A | * | 11/1999 | Ahn ............................. 713/323 |
| 6,539,101 | B1 | * | 3/2003 | Black .......................... 382/124 |

FOREIGN PATENT DOCUMENTS

| | | |
|---|---|---|
| JP | 58-40662 | 3/1983 |
| JP | 5-250319 | 9/1993 |
| JP | 10-198453 | 7/1998 |

OTHER PUBLICATIONS

Inglis, D., et al., "SA 17.7: A Robust, 1.8V, 250µW, Direct Contact 500dpi Fingerprint Sensor," IEEE ISSCC 98, SA 17.7, pp. 284-285 (1998).

Asai, K., et al., "Automated Fingerprint Identification by Minutia-Network Feature—Feature Extracting Process," Transactions of the Institute of Electronics and Communication Engineers, (Japan) vol. J72-D-II, No. 5, pp. 724-732 (May 1989).

Asai, K., et al., "Automated Fingerprint Identification by Minutia-Network Feature—Matching Processes," Transactions of the Institute of Electronics and Communication Engineers, (Japan) vol. J72-D-II, No. 5, pp. 733-740 (May 1989).

* cited by examiner

Primary Examiner—Charles Rones
Assistant Examiner—Hassan Mahmoudi
(74) Attorney, Agent, or Firm—Foley & Lardner LLP

(57) ABSTRACT

An information processing device and an information processing method using fingerprint matching lighten the burden imposed the user in suspension/resumption of use of the device, and enable suspension/resumption to be performed smoothly when a plurality of users share the identical information processing device and when a plurality of users have respective individual information (to what extent of the electronic book the user reads to be progressed, etc) in connection with the information processing device. User is identified according to inputted fingerprint. When use of the device is suspended, individual information (for instance, work progressive information, work environmental information, work historical information) of the user regarding the information processing device is associated with the user to preserve, while when use of the device is resumed, identified individual information to the user preserved corresponding to the user is selected to be provided to the user.

10 Claims, 6 Drawing Sheets

F I G. 6
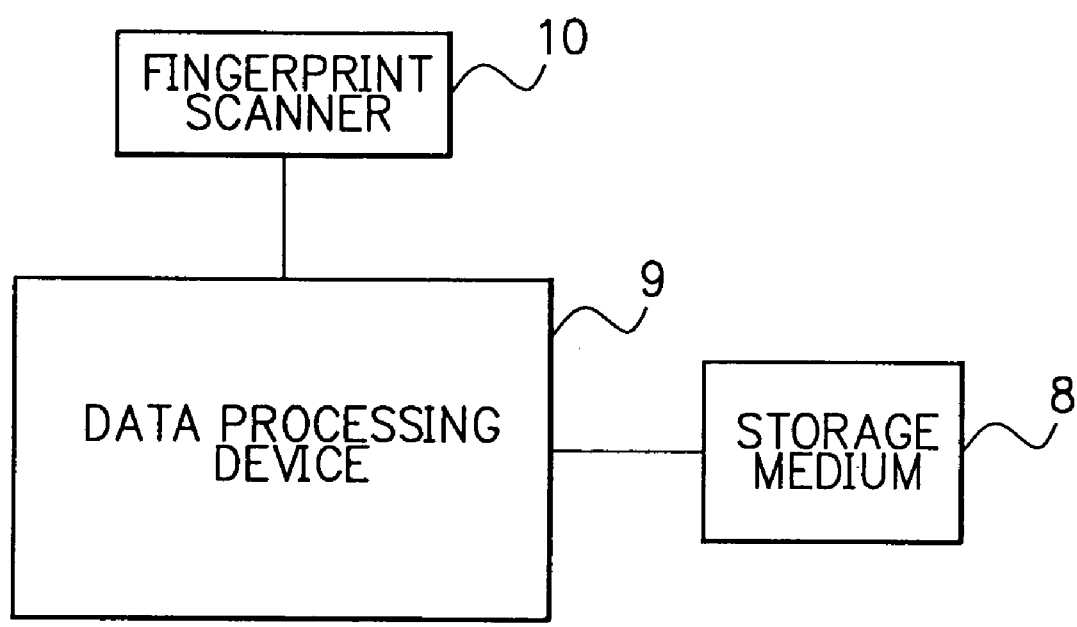

INFORMATION PROCESSING DEVICE AND INFORMATION PROCESSING METHOD USING FINGERPRINT IDENTIFICATION

BACKGROUND OF THE INVENTION

The present invention relates to an information processing device using fingerprint matching. More to particularly, this invention relates to an information processing device and an information processing method in which suspension-resumption function is improved when a large number of people share the identical information processing device.

DESCRIPTION OF THE PRIOR ART

As one example in which a plurality of persons share the identical information device is an electronic picture book. The electronic picture book for the sake of amusements or education is that content of the picture book is converted into electronic data and stored in the storage medium for indicating by using information processing device and so forth so that when the user pushes button "progress" of the device, the content of the book is indicated on display screen as image successively as turning the pages thereof. Such the information device for electronic picture book is provided for a home, a kindergarten, or a primary school, so it is supposed that one information device for the electronic picture book is shared with a plurality of users. In such the condition, it occurs that on one's way of the user A of one person reads to be progressed the electronic picture book, namely on one's way of the user A of one person uses the information device, another user B should use that device for lack of an alternative. In such the case, it becomes necessary to obtain suspension/resumption function so as to enable reading to be resumed smoothly from the point where the user A finished reading at the last time, when the user A is capable of using the device again.

Further, another example is a game device. The game device is provided for the facilities for amusements or a home. The former is as a matter of course used by a plurality of the users. Also the latter is used by a plurality of the users such as brothers, friends, or the like. The game device is also necessary to preserve therein progressive condition or operation environment or the like in every user, thus it becomes necessary to provide the suspension/resumption function similar to the information device for electronic picture book.

Furthermore, still another example is a retrieval device (for instance, such device retrieves home page in the internet), which is shared with a plurality of users. In the retrieval operation, it is capable of being improved retrieval efficiency by using past retrieval history, therefore, at the time of start of use of the retrieval device, it is desirable to be able to restore the own past retrieval history information to resume.

The conventional method as the suspension/resumption function is that when the user suspends the use of the device, individual information for the user that to what extent of the picture book the user reads to be progressed, is preserved while adding a name (file name or password). When the user resumes the use of the device, the user obtains the own individual information regarding the information device while specifying the name (file name or password).

However, as the method for realizing the suspension/resumption function, when the user suspends the use of the information device, the user preserves the own individual information while adding the file name thereto. When the user resumes the use of the information device, the user should obtain the own individual information by specifying the file name. This method forces the user to store the file name into which the own individual information is preserved. Such the burden becomes heavy for the user in that since the password is effective due to meaningless character string, the user should use such the meaningless character string as the password in order that the own individual information is not changed by another person.

Further, there is the problem that operation for inputting file name or specifying file name is not always easy for the user such as a little child, a minor, an advanced age, or a disabled person.

SUMMARY OF THE INVENTION

In view of the foregoing, it is an object of the present invention, in order to overcome the above mentioned problem, to provide an information processing device and an information processing method using fingerprint matching in which when a plurality of users share the identical information device and the plurality of users have respective individual information (to what extent of the electronic picture book the user read to be progressed, etc) regarding the information device, the invention reduces the burden of the user at the time of suspension/resumption of use of the device and it is capable of being performed the suspension/resumption smoothly.

An automatic reading and matching technique has been developed for single-fingerprint identification. The identification strategy is based on the matching of minutiae, such as ridge endings and ridge bifurcations of a fingerprint. Pattern features for identification are detected from the fingerprint and described by minutia positions, directions and relationships. The relationship is expressed by four ridge counts. Each ridge count is measured between the concerned minutia and its nearest minutia in each quadrant of a local coordinate system, which is determined by the position and the direction of the minutia. In the fingerprint identification, the best matched minutiae pairs are finally selected according to the degree of similarity between fingerprint features under examination and registered fingerprint in a file. Similarity between two fingerprints is obtained through comparison of selected minutiae pairs.

Several identification strategies, based upon the matching of minutiae, such as ridge ending or ridge bifurcation of fingerprints have been developed for automatic fingerprint identification systems. Since minutiae are simple patterns, it is easy to detect them automatically. Consequently, minutiae matching strategy is suitable for automatic finger print identification system.

According to a first aspect of the present invention, in order to achieve the above-mentioned object, there is provided an information processing method using fingerprint matching comprising the steps of identifying user according to an inputted fingerprint, preserving user's individual information associated with the user in connection with a device in every identified user at the time when the user suspends use of the device which the user uses, and selecting the user's individual information corresponding to identified user, which is preserved, to provide for the user when the user resumes use of the device.

According to a second aspect of the present invention, in the first aspect, there is provided an information processing method using fingerprint matching, wherein the user's individual information includes any of work progressive information, work environmental information, and work historical information of the user who uses said device.

According to a third aspect of the present invention, there is provided an information processing device using fingerprint matching which comprises a fingerprint image input means for acquiring fingerprint image of a user to output the fingerprint image to a fingerprint feature extraction means, a suspension/resumption management means accepting instruction either suspension or resumption of use of the device from the user to output the instruction either suspension or resumption to a fingerprint feature extraction means and a user individual information storage means, the fingerprint feature extraction means receiving the fingerprint image from the fingerprint image input means, before extracting fingerprint feature from the fingerprint image, when received instruction from the suspension/resumption management means is suspension, outputting the fingerprint feature to the user individual information storage means, while when received instruction from the suspension/resumption management means is resumption, outputting the fingerprint feature to a fingerprint matching means, a user individual information storage means storing therein the fingerprint feature received from the fingerprint feature extraction means associated with the user's individual information regarding the device when instruction received from the suspension/resumption management means is suspension, while when instruction received from the suspension/resumption management means is resumption, outputting still stored fingerprint feature (hereinafter referring to registered fingerprint feature) group to receive matching result from fingerprint matching means, subsequently, selecting fingerprint feature from inside of registered fingerprint feature group according to the matching result, thus selecting the user's individual information associated with selected the fingerprint feature in order to output to a user individual information processing means, a fingerprint matching means receiving the registered fingerprint feature group from the user individual information storage means, before implementing matching processing between the registered fingerprint feature group and fingerprint feature received from the fingerprint feature extraction means, thus outputting matching result to the user individual information storage means, and a user individual information processing means receiving the user's individual information from the user individual information storage means, before implementing specific processing in answer to content of the user's individual information.

According to a fourth aspect of the present invention, in the third aspect, there is provided an information processing device using fingerprint identification, wherein the user's individual information includes any of work progressive information, work environmental information, and work historical information of the user who uses the device.

According to a fifth aspect of the present invention, in the third or fourth aspect, there is provided an information processing device using fingerprint identification, wherein the suspension/resumption management means outputs the instruction of either suspension or resumption to also an indication information management means in addition to the fingerprint feature extraction means and the user individual information storage means, and the user individual information processing means is provided with a instruction input means accepting an instruction of operation of the device from the user in order to output instruction of the operation to the indication information processing means, a presentation information management means storing therein management information of information to be presented for the user, in order to output the management information while updating the management information in answer to instruction of the operation to presentation means when receiving instruction of the operation from the instruction input means, a presentation means receiving the management information from the presentation information management means, before acquiring information to be presented for the user from the device data storage means according to the management information in order to present, and a device data storage means storing therein information which the device should maintain, when the presentation information management means receives instruction of suspension from the suspension/resumption management means, outputting the management information to the user individual information storage means, while when the presentation information management means receives instruction of resumption from the suspension/resumption management means, updating storage content according to the management information received from the user individual information storage means.

According to a sixth aspect of the present invention, in the fifth aspect, there is provided an information processing device using fingerprint identification, in which the information processing device using fingerprint identification comprises at least one client section consisting of the fingerprint scanner, the suspension/resumption management means, the feature extraction means, the instruction input means, the presentation means, and the presentation information management means, and at least one server section consisting of the user individual information storage means, the fingerprint matching means, and the device data storage means, wherein the client section is connected with the server section through network.

According to a seventh aspect of the present invention, in any of the third to sixth aspects, there is provided an information processing device using fingerprint identification, wherein the information processing device using fingerprint identification is any of an electronic picture book device, a game device, and a retrieval device.

According to an eighth aspect of the present invention, there is provided a storage medium stored therein a computer implemented information processing program using fingerprint identification comprising the steps of a step for identifying user according to inputted fingerprint, a step for accepting instruction of either suspension or resumption, a step for storing the user's individual information regarding a device into which the program is installed associated with the user in the case of reception of instruction of suspension in every identified user, and a step for selecting to be provided the individual information corresponding to identified user in the case of reception of instruction of resumption from the inside of user's individual information stored previously.

As stated above according to the present invention, the information processing device identifies user by fingerprint inputted, at the time of suspension of use of the information processing device, preserving the user's individual information (for instance work progressive information, work environmental information, or work historical information) regarding the information processing device associated with the user, while at the time of resumption of use of the information processing device, acquiring above-described individual information corresponding to the identified user in order to provide the individual information for the user.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 6 is a block diagram showing a fifth embodiment of the present invention.

DETAILED DESCRIPTION OF THE PREFERRED EMBODIMENT

Figure 1:
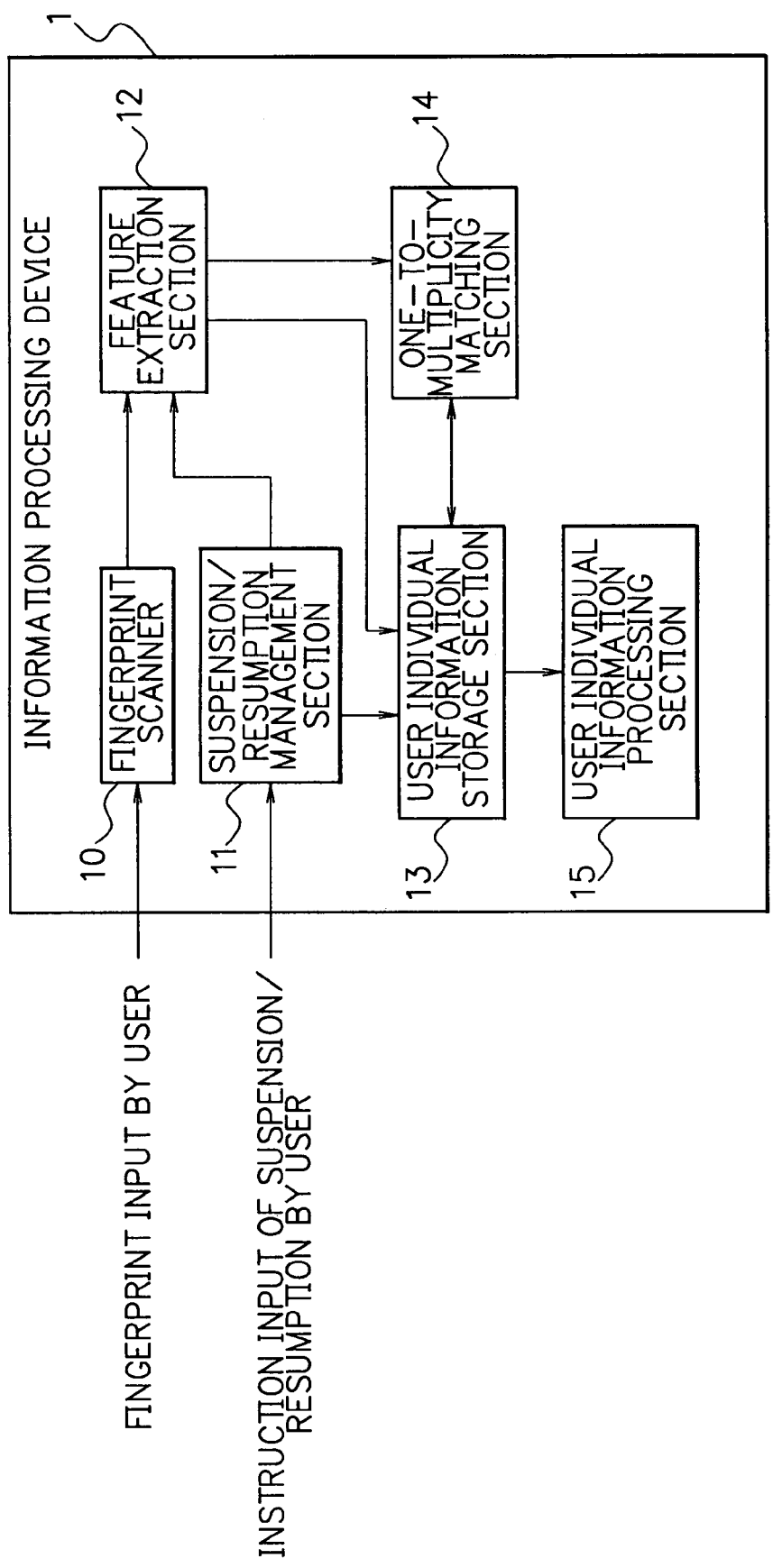
FIG. 1 is a block diagram showing a configuration of enforcement of the present invention.

A preferred configuration of an enforcement of the present invention will be described referring to FIG. 1. An information processing device 1 of the present invention comprises a fingerprint scanner 10, a suspension/resumption management section 11, a feature extraction section 12, a user individual information storage section 13, a one-to-multiplicity matching section 14, and a user individual information processing section 15.

The fingerprint scanner 10 captures the fingerprint image at the time when finger of the user comes into contact with the fingerprint scanner 10. The fingerprint scanner 10 converts the image data into the digital image data so as to be able to process in the feature extraction section 12. The fingerprint scanner is constituted in such a way that the fingerprint scanner causes light emitted by LED to reflect by a prism, at this time, capturing the fingerprint image by converting the reflected light into the digital image using CCD while utilizing the matter that reflectance is different between fingerprint ridge and valley section of the finger in accordance with fingerprint ridge of the finger placed in the outside of reflected face. The above system is an optical system using optical scanner, and also similar system can be realized by solid-state fingerprint sensor. Such the solid-state fingerprint sensor is disclosed in "A Robust, 1.8 V, 250 uW, Direct Contact 500 dpi Fingerprint Sensor" by Inglis et al. IEEE ISSCC 98, SA 17.7, pp. 285—285, 1998. 2.

The suspension/resumption management section 11 implements instructions of suspension or resumption of use of the device to the feature extraction section 12 and/or the user individual information storage section 13 according to an input of the user.

The feature extraction section 12 receives the fingerprint image from the fingerprint scanner 10. The feature extraction section 12 executes processing for extracting feature using in fingerprint matching regarding the fingerprint image. As a realization method of feature extraction, for instance, there is a method described in the following literature: "Automated Fingerprint Identification by Minutia-Network Feature—Feature Extraction Processes—" by Ko ASAI, Yukio HOSHINO and Kazuo KIJI, "Transactions of the Institute of Electronic and Communication Engineers (Japan)" vol. J72-D-II, no. 5, pp, 724 to 732 (May 1989). Here, this method extracts a ridge-pattern from gray level image including the ridge according to binarization processing and thinning processing. The method detects position of the Ending-point and the Bifurcation. Subsequently, the method counts number of ridges crossing on a line which connects the Ending-point to the Bifurcation. The method represents the relationship view as a digital data which is a fingerprint feature for the sake of the fingerprint matching. The fingerprint feature which is extracted (hereinafter, referring to inputted fingerprint feature) is outputted to the user individual information storage section 13 when receiving instruction of suspension from the suspension/resumption management section 11, while when instruction of resumption is received, the fingerprint feature is outputted to the one-to-multiplicity matching section 14.

The individual information storage section 13 receives the instruction of the suspension from the suspension/resumption management section 11. The individual information storage section 13 stores therein the inputted fingerprint feature received from the feature extraction section 12 associated with an individual information of the user regarding the information processing device 1 (hereinafter, fingerprint information stored in the user individual information storage section 12 is referred as registered fingerprint feature). Further, fingerprint feature of different finger of the user of one person is capable of being stored while being associated with respective different individual information.

Here, the user individual information includes the whole data which are regarded as useful information in relation to the user himself in the data which is processed by the information processing device 1. Such data are work progressive information, work environmental information, and work historical information. The work progressive information informs that the work is progressed to what extent. The work environmental information informs that the work is implemented in what environment. The work historical information informs that the work is performed with what instruction. The above work information is capable of being thought as the data when the user suspends use of the device. Concretely, following information is capable of being thought: "to what extent of the electronic picture book the user reads to be progressed", "to what extent of the game the user progresses", "what background screen is selected in display screen", "the display screen did become what layout", "what retrieval result is obtained until now", "what retrieval key is given until now", "what command is given until now".

Such the user individual information is also specified by the user himself. As well as the user individual information is also specified automatically in the information processing device 1.

The user individual information storage section 13 receives the instruction of resumption from the suspension/resumption management section 11. The user individual information storage section 13 outputs registered fingerprint feature group to the one-to-multiplicity matching section 14. The user individual information storage section 13 selects the registered fingerprint feature having the most highest similarity of the inputted fingerprint feature and the user's individual information which is associated therewith, according to matching result received from the one-to-multiplicity matching section 14. The user individual information storage section 13 outputs this user individual information to the user individual information processing section 14.

The one-to-multiplicity matching section 14 receives the inputted fingerprint feature from the feature extraction section 12. The one-to-multiplicity matching section 14 receives the registered fingerprint feature group from the user individual information storage section 13. The one-tomultiplicity matching section compares the inputted fingerprint feature with the respective registered fingerprint feature to calculate the similarity, thus outputting the fingerprint feature with the highest similarity in the registered fingerprint feature group to the user individual information storage section 13 as the identification result.

Here, it is suitable that the similarity is enhanced when the fingerprint feature to be compared is obtained from the identical finger. It is capable of being used Mahalanobis distance in the special space formed in accordance with the fingerprint feature. Further, such the similarity is obtained by the method which is disclosed in, for instance, "Automated Fingerprint Identification by Minutia-Network Feature—Matching Process—" by Ko ASAI, Yukio HOSHINO, and Kazuo KIZI, Transactions of the Institute of Electronics and Communication Engineers (Japan), vol. J72-D-II, no. 5, pp, 733 to 740 (May 1989), as the prior art.

Further, when a matching processing is implemented in the one-to-multiplicity matching section 14, it is suitable to output the registered fingerprint feature giving similarity more than threshold value as a matching result without matching with the whole registered fingerprint feature in the case where there is detected the registered fingerprint feature which gives the similarity more than prescribed threshold value in the process of matching processing.

The user individual information processing section 15 receives the selected user individual information from the user individual information storage section 13. The user individual information processing section 15 implements dispatch/presentation of individual information to the user, establishment of the information processing device 1 or communication for another device group in accordance with content of the user individual information.

Figure 2:
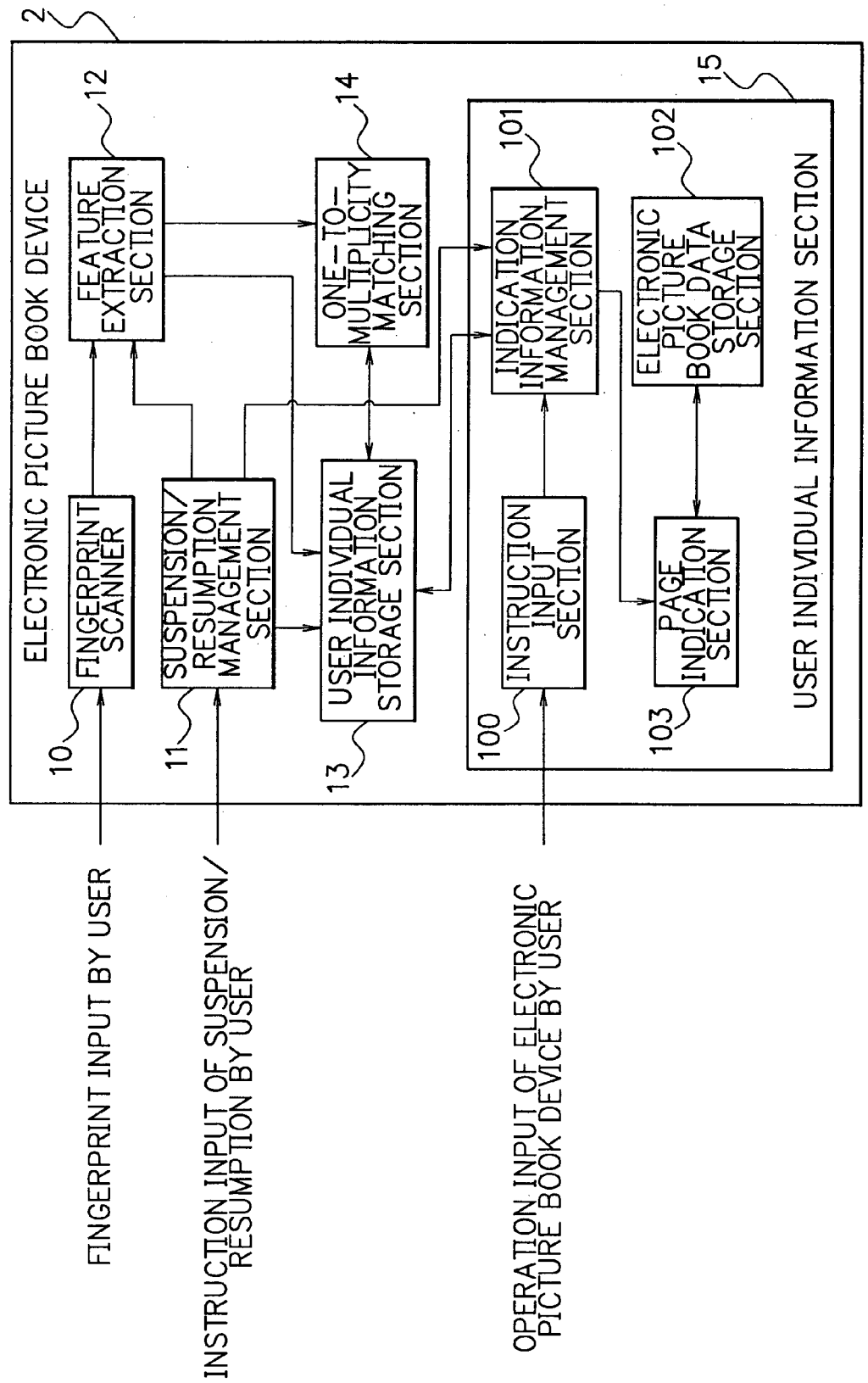
FIG. 2 is a block diagram showing a first embodiment of the present invention.

Next, there will be described a first embodiment of the configuration of the enforcement of the present invention referring to FIG. 2. Such embodiment is that the present invention is applied to the electronic picture book device.

The electronic picture book device 2 to be the present embodiment is constituted by comprising a fingerprint scanner 10 for inputting therein a fingerprint stamping image from the user, a suspension/resumption management section 11, a feature extraction section 12, a user individual information storage section 13, a one-to-multiplicity matching section 14, and a user identical information processing section 15. The user individual information processing section 15 is constituted by comprising an instruction input section 100, an indication information management section 101, an electronic picture book data storage section 102, and a page indication section 103.

There are various user individual information in the electronic picture book device as follows: Did the user read to be advanced electronic picture book to what extent? What background picture is selected in the display screen? Is the speech male or female when text is outputted by the speech ? In the present embodiment, the information that the user reads to be advanced the electronic picture book to what extent (location information of page) is taken as example of the user individual information to implement explanation.

In the present embodiment, constitution and operation of the fingerprint scanner 10, the feature extraction section 12, and the one-to-multiplicity matching section 14 are the same constitution and operation as those described referring to FIG. 1.

The suspension/resumption management section 11 outputs the instruction of suspension or resumption to the feature extraction section 12 and the user individual information storage section 13, and also outputs to the indication information management section 101.

The user individual information storage section 13 receives the instruction of suspension from the suspension/resumption management section 11. The user individual information storage section 13 receives the position information of the page from the indication information management section 101 to store therein the position information of the page associated with the inputted fingerprint feature. Further, the user individual information storage section 13 receives the instruction of resumption from the suspension/resumption management section 11. The user individual information storage section 13 outputs the position information of the page selected according to the result of the matching to the indication information management section 101.

The instruction input section 100 accepts instruction of operation regarding the electronic picture book such as "to progress page of the picture book", "to return page of the picture book", and so forth from the user. The instruction accepted is outputted to the indication information management section 101.

The indication information management section 101 stores therein a position information of a page to be indicated. When the indication information management section 101 receives instruction of "to progress page of the picture book" and so forth from the instruction input section 100, the indication information management section 101 updates the position information of the stored page in accordance with the instruction to output to the page indication section 104.

Further, when the indication information management section 101 receives the instruction of the suspension from the suspension/resumption management section 11, outputting the position information of the page to the user individual information storage section 13. Here, it is suitable to utilize not only page number which opens now, but to what extent of the electronic picture book the user reads within the page as detailed information as the position information of the page. Such the detailed information is capable of being obtained in such a way that the page indication section 103 causes touch panel function to be provided therewith, before the user instructs data to what extent of the electronic picture book the user reads within the page in the touch panel.

Furthermore, when the indication information management section 101 receives the instruction of the resumption from the suspension/resumption management section 11, receiving the position information of the page from the user individual information storage section 13 to update storage content, thus outputting to the page indication section 104.

The electronic picture book data storage section 102 stores therein data of the electronic picture book to output data in accordance with a demand from the page indication section 103.

The page indication section 103 receives the position information of the page from the indication information management section 101, thus obtaining data of the page to be indicated according thereto from the electronic picture book data storage section 102 to indicate.

Figure 3:
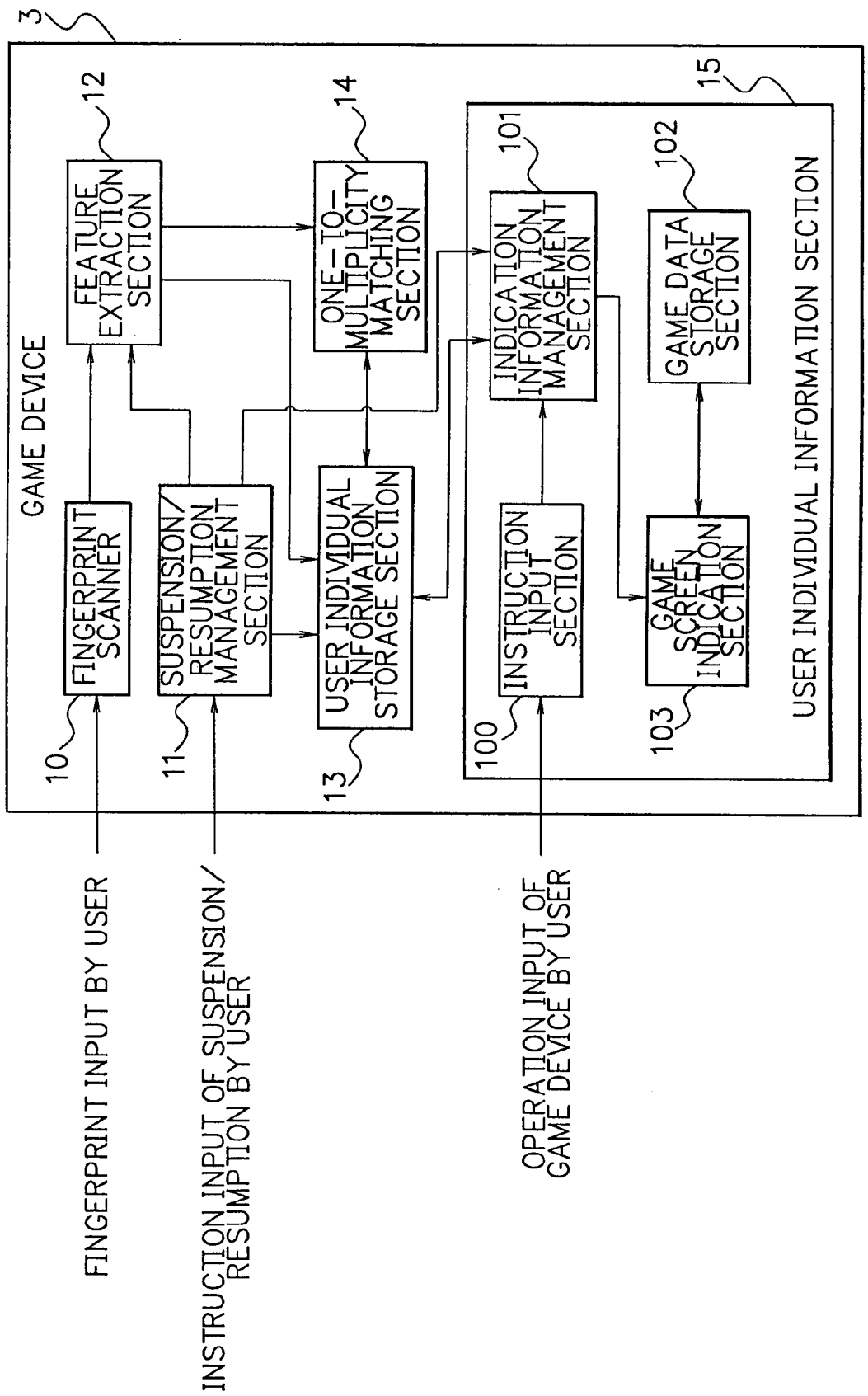
FIG. 3 is a block diagram showing a second embodiment of the present invention.

A second embodiment is to apply the present invention to a game device having the same constitution/operation as that of the first embodiment. Namely, as shown in FIG. 3, it is capable of being constituted a game device 3 having suspension/resumption function according to the present invention in such a way that the page indication section of the first embodiment is replaced with a game screen indication section, the electronic picture book storage section of the first embodiment is replaced with a game data storage section, and the position information of the page of the first embodiment is replaced with progress condition information of the game.

Figure 4:
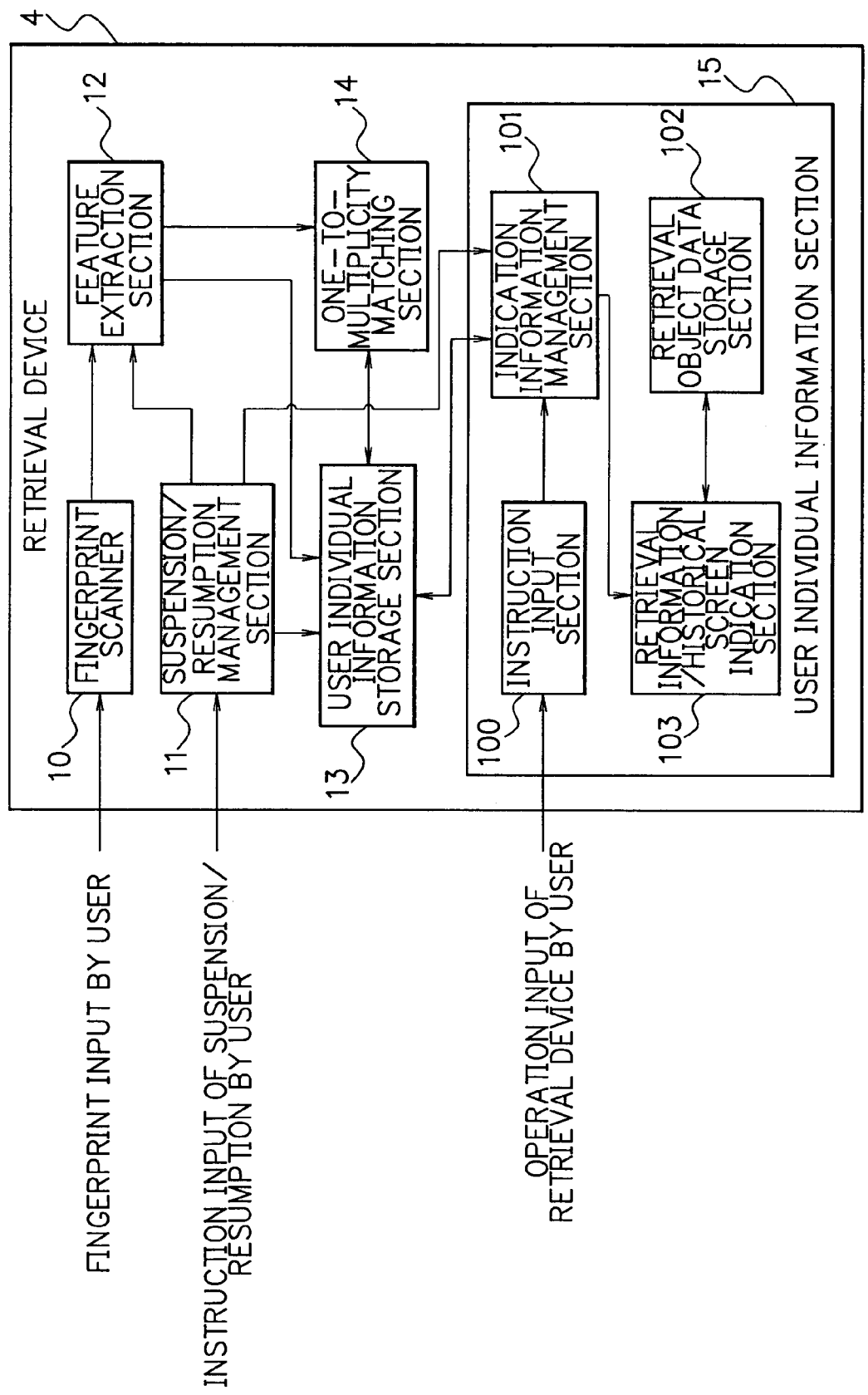
FIG. 4 is a block diagram showing a third embodiment of the present invention.

Further, a third embodiment is to apply the present invention to a retrieval device having the same constitution/operation as that of the first embodiment. Namely, as shown in FIG. 4, it is capable of being constituted a retrieval device 4 having suspension/resumption function according to the present invention in such a way that the page indication section of the first embodiment is replaced with a retrieval information-history indication section, the electronic picture book data storage section of the first embodiment is replaced with retrieval object data storage section, and the position information of the page of the first embodiment is replaced with a retrieval history information. In this case, the retrieval history information includes history of retrieval result, or history of retrieval key, or both thereof. Furthermore, the third embodiment enables the past retrieval result and/or the retrieval key used in the past to be reused in such a way that the user instructs in relation to indicated retrieval history information in the retrieval information-history indication section, thus it is capable of being improved expediency in retrieval.

Figure 5:
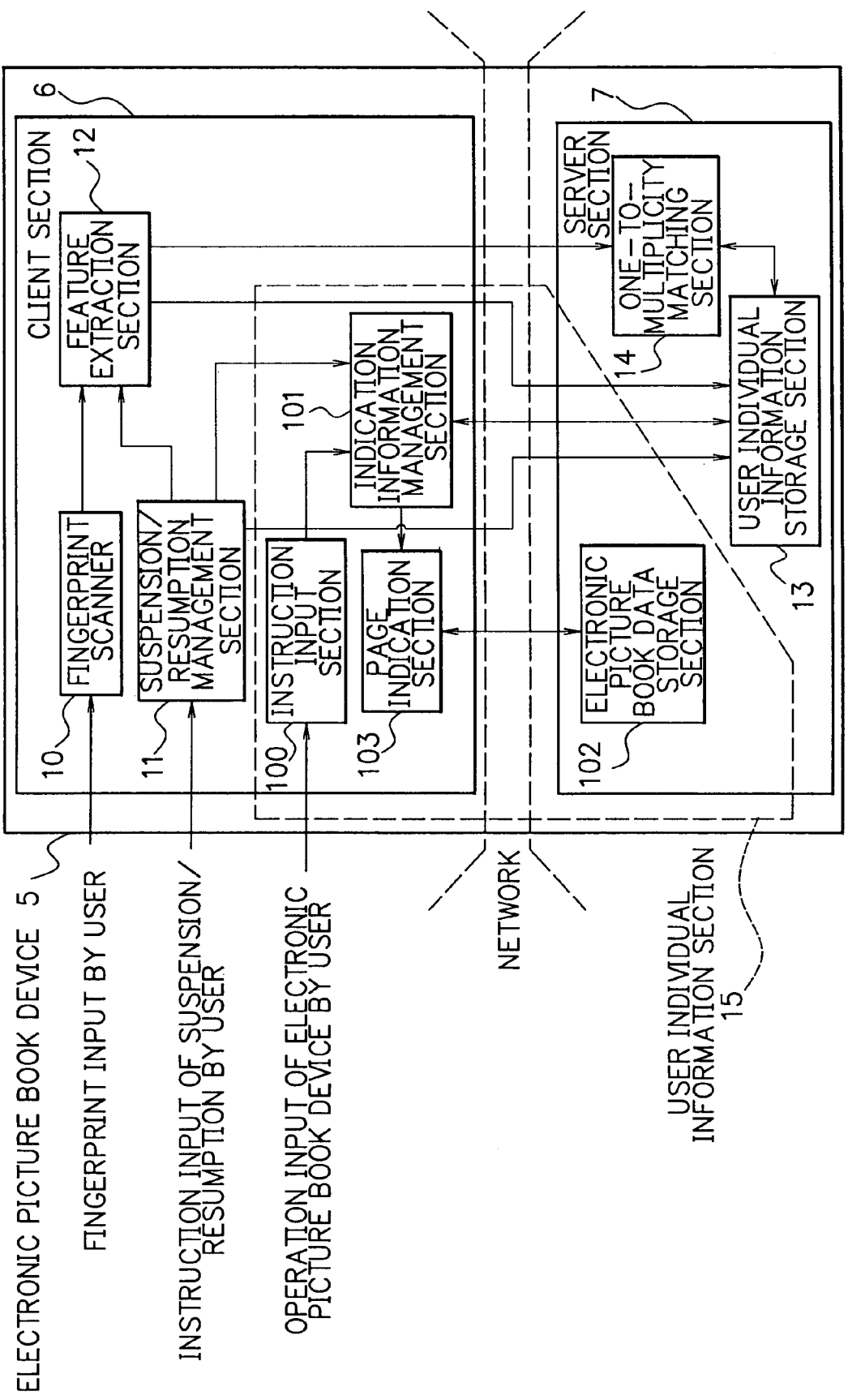
FIG. 5 is a block diagram showing a fourth embodiment of the present invention.

Moreover, a fourth embodiment is to extend the first embodiment to the configuration for utilizing the network. As shown in FIG. 5, in an electronic picture book device 5 to be the fourth embodiment, a client section 6 for indicating the electronic picture book to the user is connected to a server section 7 for managing the electronic picture book data through a network. It is also suitable that there are a plurality of the server sections and the client sections. However, in the present embodiment, configuration of the embodiment consists of one server section and one client section.

In such the electronic picture book device utilizing the network, for instance, there is provided the server section in the electronic library, on the other hand the user reads the electronic picture book from any client section.

The client section 6 is constituted by comprising a fingerprint scanner 10, a suspension/resumption management section 11, a feature extraction section 12, an instruction input section 100, an indication information management section 101, and a page indication section 103. Further, the server section 7 is constituted by comprising a user individual information storage section 13, a one-to-multiplicity matching section 14, and an electronic picture book data storage section 102.

Operation of respective constitution elements of the present embodiment is fundamentally the same as that of the constitution elements of the first embodiment. A different point from the first embodiment is that input and output between constitution elements included in the client section and constitution elements included in the server section are implemented through the network.

Next, there will be described a fifth embodiment of the present invention referring to the drawing. Referring to FIG. 6, the fifth embodiment is provided with a storage medium 8 stored therein an information processing program using fingerprint identification. The storage medium 8 is suitably a storage medium such as a CD-ROM, a magnetic disk, a semiconductor memory or the like. It is included the case that the data is communicated through the network.

The information processing program using the fingerprint identification is read from the storage medium 8 to the data processing device 9 to control operation of the data processing device 9. The data processing device 9 identifies the user in accordance with a fingerprint image inputted from the fingerprint scanner 10 according to control of the information processing program using the fingerprint identification. The data processing device 9, in the case of reception of instruction for suspension, stores therein individual information for the user associated with the user regarding the device into which the program is installed in every identified user. The data processing device 9, in the case of reception of instruction for resumption, selects the identified individual information corresponding to the user from the inside of the user individual information stored therein previously to provide for the user.

Namely, the data processing device 9 executes the same processing as the processing according to the suspension/resumption management section 11, the feature extraction section 12, the user individual information storage section 13, the one-to-multiplicity matching section 14, and the user individual information processing section 15 in FIG. 1 in accordance with control of the information processing program using the fingerprint identification.

As described above, according to the present invention, a plurality of users share the identical information device, and the plurality of users have respective individual information (for instance, work progressive information, work environmental information, and work historical information) concerning the information device. The present invention identifies the user according to the inputted fingerprint, thus at the time of suspension of use of the device, preserving individual information for the user regarding the information device associated with the user, while at the time of resumption of use of the device, selecting preserved individual information for the user corresponding to the identified user to provide for the user. It is capable of being reduced burden of the user at the time of suspension/resumption of use of the device, and it is capable of performing suspension/resumption of use of the device smoothly.

While preferred embodiments of the invention have been described using specific terms, the description has been for illustrative purpose only, and it is to be understood that changes and variations may be made without departing from the spirit or scope of the following claims.

What is claimed is:

1. An information processing device using fingerprint identification comprising:
   a fingerprint image input means for acquiring fingerprint image of a user to output said fingerprint image to a fingerprint feature extraction means;
   a suspension/resumption management means accepting instruction corresponding to either suspension or resumption of use of said device from said user to output said instruction for either suspension or resumption to a fingerprint feature extraction means and a user individual information storage means;
   the fingerprint feature extraction means receiving said fingerprint image from said fingerprint image input means, before extracting fingerprint feature from said fingerprint image, when received instruction from said suspension/resumption management means is suspension, outputting said fingerprint feature to said user individual information storage means, while when received instruction from said suspension/resumption management means is resumption, outputting said fingerprint feature to a fingerprint matching means;
   a user individual information storage means storing therein said fingerprint feature received from the fingerprint feature extraction means associated with the user's individual information regarding said device when instruction received from said suspension/resumption management means is suspension, while when instruction received from said suspension/resumption management means is resumption, outputting the stored fingerprint feature, as well as all other stored fingerprint features as a registered fingerprint feature group, to receive matching result from fingerprint matching means, subsequently, selecting fingerprint feature from among fingerprint features in the registered fingerprint feature group according to said matching result, thus selecting said user's individual information associated with said selected fingerprint feature in order to output to a user individual information processing means;

said fingerprint matching means receiving the registered fingerprint feature group from said user individual information storage means, before implementing matching processing between said registered fingerprint feature group and the fingerprint feature received from the fingerprint feature extraction means, thus outputting matching result to said user individual information storage means; and said user individual information processing means receiving the user's individual information from the user individual information storage means, before implementing specific processing in answer to content of said user's individual information, wherein said suspension/resumption management means outputs said instruction of either suspension or resumption to also an indication information management means in addition to the fingerprint feature extraction means and the user individual information storage means, and said user individual information processing means is provided with:

an instruction input means accepting an instruction of operation of said device from the user in order to output instruction of said operation to the indication information processing means;

a presentation information management means storing therein management information of information to be presented for the user, in order to output said management information while updating said management information in answer to instruction of said operation to presentation means when receiving instruction of said operation from said instruction input means;

a presentation means receiving said management information from said presentation information management means, before acquiring information to be presented for the user from the device data storage means according to said management information in order to present; and a device data storage means storing therein information which the device should maintain, when said presentation information management means receives instruction of suspension from said suspension/resumption management means, outputting said management information to the user individual information storage means, while when said presentation information management means receives instruction of resumption from said suspension/resumption management means, updating storage content according to said management information received from said user individual information storage means.

2. An information processing device using fingerprint identification as claimed in claim 1, in which said information processing device using fingerprint identification comprises at least one client section consisting of said fingerprint scanner, said suspension/resumption management means, said feature extraction means, said instruction input means, said presentation means, and said presentation information management means, and at least one server section consisting of said user individual information storage means, said fingerprint matching means, and said device data storage means, wherein said client section is connected with said server section through network.

3. An information processing device using fingerprint identification as claimed in claim 2, wherein said information processing device using fingerprint identification is any of an electronic picture book device, a game device, and a retrieval device.

4. An information processing device using fingerprint identification as claimed in claim 1, wherein said information processing device using fingerprint identification is any of an electronic picture book device, a game device, and a retrieval device.

5. An information processing device using fingerprint identification as claimed in claim 1, wherein said information processing device using fingerprint identification is any of an electronic picture book device, a game device, and a retrieval device.

6. An information processing device using fingerprint identification comprising:

a fingerprint image input means for acquiring fingerprint image of a user to output said fingerprint image to a fingerprint feature extraction means;

a suspension/resumption management means accepting instruction corresponding to either suspension or resumption of use of said device from said user to output said instruction for either suspension or resumption to a fingerprint feature extraction means and a user individual information storage means;

the fingerprint feature extraction means receiving said fingerprint image from said fingerprint image input means, before extracting fingerprint feature from said fingerprint image, when received instruction from said suspension/resumption management means is suspension, outputting said fingerprint feature to said user individual information storage means, while when received instruction from said suspension/resumption management means is resumption, outputting said fingerprint feature to a fingerprint matching means;

a user individual information storage means storing therein said fingerprint feature received from the fingerprint feature extraction means associated with the user's individual information regarding said device when instruction received from said suspension/resumption management means is suspension, while when instruction received from said suspension/resumption management means is resumption, outputting the stored fingerprint feature, as well as all other stored fingerprint features as a registered fingerprint feature group, to receive matching result from fingerprint matching means, subsequently, selecting fingerprint feature from among fingerprint features in the registered fingerprint feature group according to said matching result, thus selecting said user's individual information associated with said selected fingerprint feature in order to output to a user individual information processing means;

said fingerprint matching means receiving the registered fingerprint feature group from said user individual information storage means, before implementing matching processing between said registered fingerprint feature group and the fingerprint feature received from the fingerprint feature extraction means, thus outputting matching result to said user individual information storage means; and said user individual information processing means receiving the user's individual information from the user individual information storage means, before implementing specific processing in answer to content of said user's individual information, wherein said user's individual information includes any of work progressive information, work environmental information, and work historical information of the user who uses said device, wherein said suspension/resumption management means outputs said instruction of either suspension or resumption to also an indication information management means in addition to the fingerprint feature extraction means and the user individual information storage means, and said user individual information processing means is provided with:

an instruction input means accepting an instruction of operation of said device from the user in order to output instruction of said operation to the indication information processing means;

a presentation information management means storing therein management information of information to be presented for the user, in order to output said management information while updating said management information in answer to instruction of said operation to presentation means when receiving instruction of said operation from said instruction input means;

a presentation means receiving said management information from said presentation information management means, before acquiring information to be presented for the user from the device data storage means according to said management information in order to present; and a device data storage means storing therein information which the device should maintain, when said presentation information management means receives instruction of suspension from said suspension/resumption management means, outputting said management information to the user individual information storage means, while when said presentation information management means receives instruction of resumption from said suspension/resumption management means, updating storage content according to said management information received from said user individual information storage means.

7. An information processing device using fingerprint identification as claimed in claim 6, in which said information processing device using fingerprint identification comprises at least one client section consisting of said fingerprint scanner, said suspension/resumption management means, said feature extraction means, said instruction input means, said presentation means, and said presentation information management means, and at least one server section consisting of said user individual information storage means, said fingerprint matching means, and said device data storage means, wherein said client section is connected with said server section through network.

8. An information processing device using fingerprint identification as claimed in claim 7, wherein said information processing device using fingerprint identification is any of an electronic picture book device, a game device, and a retrieval device.

9. An information processing device using fingerprint identification as claimed in claim 6, wherein said information processing device using fingerprint identification is any of an electronic picture book device, a game device, and a retrieval device.

10. An information processing device using fingerprint identification as claimed in claim 6, wherein said information processing device using fingerprint identification is any of an electronic picture book device, a game device, and a retrieval device.

* * * * *